(12) United States Patent
Otsubo et al.

(10) Patent No.: US 10,125,252 B2
(45) Date of Patent: Nov. 13, 2018

(54) ETHYLENE-VINYL ALCOHOL COPOLYMER MICROPARTICLES, DISPERSION LIQUID AND RESIN COMPOSITION CONTAINING SAME, AND METHOD OF PRODUCING SAID MICROPARTICLES

(71) Applicant: Toray Industries, Inc., Tokyo (JP)

(72) Inventors: Takahiko Otsubo, Nagoya (JP); Itaru Asano, Nagoya (JP); Hiroshi Takezaki, Nagoya (JP)

(73) Assignee: Toray Industries, Inc. (JP)

( * ) Notice: Subject to any disclaimer, the term of this patent is extended or adjusted under 35 U.S.C. 154(b) by 176 days.

(21) Appl. No.: 14/889,238

(22) PCT Filed: May 21, 2014

(86) PCT No.: PCT/JP2014/063414
§ 371 (c)(1),
(2) Date: Nov. 5, 2015

(87) PCT Pub. No.: WO2014/192607
PCT Pub. Date: Dec. 4, 2014

(65) Prior Publication Data
US 2016/0122523 A1 May 5, 2016

(30) Foreign Application Priority Data
May 31, 2013 (JP) .................... 2013-115244

(51) Int. Cl.
*B32B 5/16* (2006.01)
*C08J 3/14* (2006.01)
(Continued)

(52) U.S. Cl.
CPC ............. *C08L 29/06* (2013.01); *C08J 3/14* (2013.01); *C08L 29/04* (2013.01); *C08L 71/02* (2013.01); *C08J 2329/04* (2013.01)

(58) Field of Classification Search
CPC ...... C08J 2323/08; C08J 2329/04; C08J 3/16; Y10T 428/2982
See application file for complete search history.

(56) References Cited

U.S. PATENT DOCUMENTS

2006/0223896 A1\* 10/2006 Lepers et al.
2006/0258803 A1 11/2006 Stark
(Continued)

FOREIGN PATENT DOCUMENTS

| JP | 3-250005 A | 11/1991 |
|---|---|---|
| JP | 06-29335 | 4/1994 |

(Continued)

OTHER PUBLICATIONS

H. Yamamoto, "SP value, base, application and calculation method", Johokiko Co., Ltd., Mar. 31, 2005, pp. 118, 54-69, and partial English translation.

(Continued)

*Primary Examiner* — Hoa (Holly) Le
(74) *Attorney, Agent, or Firm* — DLA Piper LLP (US)

(57) ABSTRACT

By first forming an emulsion in a system that separates into two phases which include a solution phase containing an ethylene-vinyl alcohol copolymer (A) as the main component and a solution phase containing a polymer (B) different from the ethylene-vinyl alcohol copolymer (A) as the main component when the copolymer (A), the polymer (B), and an organic solvent (C) having an SP value of 20 $(J/cm^3)^{1/2}$ to 30 $(J/cm^3)^{1/2}$ are dissolved and mixed together, and then causing the ethylene-vinyl alcohol copolymer (A) to precipitate as microparticles by bringing a poor solvent (D) of the ethylene-vinyl alcohol copolymer (A) into contact with the emulsion, it is possible to obtain ethylene-vinyl alcohol copolymer microparticles that have a narrow particle size distribution wherein the particle size distribution index in a (Continued)

— 100μm dry-powder state is 2 or less, have a true spherical particle shape, and exhibit excellent re-dispersibility into liquid.

4 Claims, 2 Drawing Sheets

(51) Int. Cl.
*C08L 29/06* (2006.01)
*C08L 29/04* (2006.01)
*C08L 71/02* (2006.01)

(56) References Cited

U.S. PATENT DOCUMENTS

| | | | |
|---|---|---|---|
| 2011/0070442 A1* | 3/2011 | Asano | C08G 75/23 |
| | | | 428/402 |
| 2013/0183528 A1* | 7/2013 | Echigo et al. | |
| 2013/0309497 A1 | 11/2013 | Takezaki et al. | |
| 2014/0018462 A1* | 1/2014 | Tsuboi | C08J 3/28 |
| | | | 522/113 |
| 2014/0349113 A1 | 11/2014 | Saito et al. | |

FOREIGN PATENT DOCUMENTS

| | | |
|---|---|---|
| JP | 6-256529 A | 9/1994 |
| JP | 2001-234019 A | 8/2001 |
| JP | 2001-270946 | 10/2001 |
| JP | 2004-161853 A | 6/2004 |
| JP | 2006-526050 A | 11/2006 |
| WO | 2009/142231 A1 | 11/2009 |
| WO | 2012/043509 | 4/2012 |
| WO | 2012/105140 A1 | 8/2012 |
| WO | 2013/046860 | 4/2013 |

OTHER PUBLICATIONS

J. Brandrup, et al., "Polymer Handbook Fourth Edition", John Wiley & Sons, Inc., 1999, cover and pp. 675-715.
Supplementary European Search Report dated Feb. 14, 2017, of corresponding European Application No. 14804248.4.
European Communication dated Nov. 30, 2017, of corresponding European Application No. 14804248.4.

* cited by examiner

— 100μm

— 10μm

—1μm

ETHYLENE-VINYL ALCOHOL COPOLYMER MICROPARTICLES, DISPERSION LIQUID AND RESIN COMPOSITION CONTAINING SAME, AND METHOD OF PRODUCING SAID MICROPARTICLES

TECHNICAL FIELD

This disclosure relates to ethylene-vinyl alcohol copolymer microparticles, a dispersion liquid and a resin composition containing the microparticles, and a method of producing the microparticles.

BACKGROUND

Polymer microparticles, differently from other polymer molded articles such as films, fibers, injection molded articles or extrusion molded articles, are characterized in that the specific surface area is high and the shape is spherical, and are used in modification or improvement for various materials. As major uses thereof, modifiers for cosmetics, additives for toners, additives for paints, additives to molded articles, light diffusing agents for films and the like can be exemplified.

Ethylene-vinyl alcohol copolymer is excellent in gas barrier property for oxygen and the like, oil resistance, organic solvent resistance, aroma retaining property, weatherability, and transparency. Thus, it is often used as coating materials for raw materials for wrapping materials, plastic molded articles, metals, wooden materials and the like.

In particular, in a wrapping for products of foods, medicines, electronic parts and the like, for the purpose of retaining the qualities and performance of the products by suppressing invasion of oxygen or moisture, materials applied with barrier coating with ethylene-vinyl alcohol copolymer are frequently used.

Generally, as a method of obtaining a coating layer of ethylene-vinyl alcohol copolymer, methods such as melt extrusion, injection molding, or film lamination, are broadly employed.

Layers obtained by those methods are generally thick and, to enlarge utilization of the barrier coating layer of ethylene-vinyl alcohol copolymer, a method capable of coating a thin coating layer to a complicated shape is desired. As such a method, a method of forming a thin coating layer using a solution or a dispersion of ethylene-vinyl alcohol copolymer is known.

In that connection, in a process in which a coating layer is dried and formed after the solution or dispersion is applied, to reduce the volatile amount of an organic solvent, it is preferred to use an aqueous dispersion prepared by dispersing ethylene-vinyl alcohol copolymer with poor water solubility into water.

As the method of obtaining an aqueous dispersion of ethylene-vinyl alcohol copolymer, there is a method of obtaining an aqueous dispersion of ethylene-vinyl alcohol copolymer microparticles by copolymerizing ethylene and vinyl ester monomer in an organic solvent and then taking out ethylene-vinyl alcohol copolymer microparticles by adding water to the system to cause phase inversion emulsification, and saponifying the obtained microparticles (JP HEI-3-250005 A). Further, there is a method of obtaining an aqueous dispersion of microparticles by adding a dispersion stabilizer to a solution of ethylene-vinyl alcohol copolymer, precipitating ethylene-vinyl alcohol copolymer microparticles by cooling the solution, and then carrying out solvent substitution (JP 2001-234019 A).

When an aqueous dispersion of ethylene-vinyl alcohol copolymer is formed as a coating layer, if the particle size distribution of the ethylene-vinyl alcohol copolymer microparticles in water is narrow and the particle surfaces are smooth and uniformly spherical, flowability of the microparticles is improved, workability at the time of forming a coating layer is improved, and it becomes possible to form a coating layer along a complicated shape, and a barrier coating layer obtained by drying the solvent also becomes smooth and uniform.

However, in the method described in JP HEI-3-250005 A, it is difficult to suppress coagulation of the particles during saponification, it is difficult to suppress the particle size distribution of ethylene-vinyl alcohol copolymer microparticles to be obtained to be narrow and, therefore, even if such a dispersion is used in a barrier coating process, it is difficult to obtain a uniformly thin coating layer. Also, in the aqueous dispersion disclosed in JP 2001-234019 A, as the result of detailed investigation with respect to its practicality, the shape of the obtained particles is not a true spherical shape, but an irregular shape. Further, the particles form aggregates and, thus, particles having a narrow particle size distribution have not been obtained.

As the form of ethylene-vinyl alcohol copolymer microparticles, in consideration of the practical use, an aqueous dispersion of ethylene-vinyl alcohol copolymer microparticles is preferred from the viewpoint of easy handling, but in consideration of transportation and storage, a dry-powder state is desirable from the economic viewpoint.

Furthermore, when the dry powder is added again to an aqueous solvent, it is required that the powder exhibits the same dispersibility and particle size distribution also in the liquid with good repeatability. Namely, it is preferred to obtain dry powder of ethylene-vinyl alcohol copolymer microparticles exhibiting a uniform dispersibility without forming aggregates even if being added into an aqueous solvent. However, JP HEI-3-250005 A and JP 2001-234019 A are limited to a preparation method of an aqueous dispersion, and we found that, if the microparticles are once dried, bulky and strong aggregates are formed, even if the dry powder is added again into an aqueous solvent, the microparticles are not re-dispersed, and a uniform dispersion cannot be obtained.

It could therefore be helpful to provide ethylene-vinyl alcohol copolymer microparticles narrow in particle size distribution in a dry-powder state and high in sphericity of particles. Further, it could be helpful to provide ethylene-vinyl alcohol copolymer microparticles with a true spherical shape having a good re-dispersibility, which have not only a narrow particle size distribution at a dry-powder state, but also a high dispersibility without causing coagulation even in a liquid, and have an average particle diameter equal to that in a dry-powder state even in a form of an aqueous dispersion.

SUMMARY

We thus provide:

(1) Ethylene-vinyl alcohol copolymer microparticles having a particle size distribution index in a dry-powder state of 2 or less.

(2) The ethylene-vinyl alcohol copolymer microparticles according to (1), wherein a number average particle diameter in a dry-powder state ($Dn_{dry}$) of the microparticles is 0.1 to 1,000 μm.

(3) The ethylene-vinyl alcohol copolymer microparticles according to (1) or (2), wherein a re-dispersibility index of the microparticles represented as a ratio of a volume average particle diameter in a dry-powder state ($Dv_{dry}$) to a volume average particle diameter in an aqueous-dispersion state ($Dv_{wet}$) is 1/9 or more and 9 or less.

(4) The ethylene-vinyl alcohol copolymer microparticles according to any one of (1) to (3), wherein a sphericity in a dry-powder state of the microparticles is 80 or more.

(5) A dispersion liquid containing the ethylene-vinyl alcohol copolymer microparticles according to any one of (1) to (4).

(6) A resin composition containing the ethylene-vinyl alcohol copolymer microparticles according to any one of (1) to (4).

(7) A method of producing ethylene-vinyl alcohol copolymer microparticles characterized in that, in a system that separates into two phases which include a solution phase containing an ethylene-vinyl alcohol copolymer (A) as the main component and a solution phase containing a polymer (B) different from the ethylene-vinyl alcohol copolymer (A) as the main component when the ethylene-vinyl alcohol copolymer (A), the polymer (B), and an organic solvent (C) having an SP value of 20 $(J/cm^3)^{1/2}$ or more and 30 $(J/cm^3)^{1/2}$ or less are dissolved and mixed together, after an emulsion is formed, the ethylene-vinyl alcohol copolymer (A) is precipitated as microparticles by bringing a poor solvent (D) of the ethylene-vinyl alcohol copolymer (A) into contact with the emulsion.

(8) The method of producing ethylene-vinyl alcohol copolymer microparticles according to (7), wherein organic solvents of the respective phases at the time of phase separation into two phases are substantially same.

(9) The method of producing ethylene-vinyl alcohol copolymer microparticles according to (7) or (8), wherein the polymer (B) different from the ethylene-vinyl alcohol copolymer (A) is at least one selected from the group consisting of polyvinyl alcohol and polyethylene oxide.

(10) The method of producing ethylene-vinyl alcohol copolymer microparticles according to any one of (7) to (9), wherein the organic solvent (C) is at least one selected from the group consisting of N-methyl-2-pyrrolidone, dimethylsulfoxide and N,N-dimethylformamide.

(11) The method of producing ethylene-vinyl alcohol copolymer microparticles according to any one of (7) to (10), wherein a temperature at the time of bringing the poor solvent (D) into contact with the emulsion is 30° C. or higher.

Ethylene-vinyl alcohol copolymer microparticles narrow in particle size distribution in a dry-powder state and high in sphericity of particles can be provided.

In particular, it is possible to provide ethylene-vinyl alcohol copolymer microparticles with a true spherical shape having a good re-dispersibility, which have not only a narrow particle size distribution at a dry-powder state, but also a high dispersibility without causing coagulation even in a liquid, and have an average particle diameter equal to that in a dry-powder state even in a form of an aqueous dispersion.

DETAILED DESCRIPTION

Figure 1:
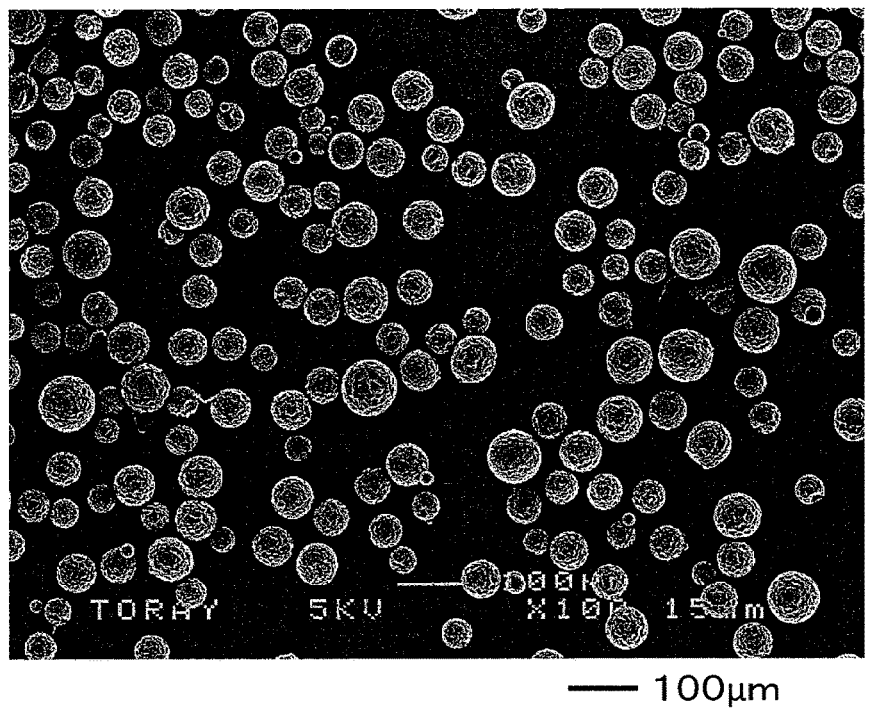
FIG. 1 is an image of scanning electron microscope (magnification: 100 times) of ethylene-vinyl alcohol copolymer microparticles prepared in Example 3.

Ethylene-vinyl alcohol copolymer microparticles comprise ethylene-vinyl alcohol copolymer usually prepared by copolymerizing ethylene and vinyl acetate and then saponifying.

As the composition of ethylene-vinyl alcohol copolymer, it is desired that the ethylene content (a rate of the number of moles of ethylene units to the number of moles of all structural units forming the ethylene-vinyl alcohol copolymer) is preferably 15 mol. % or more, more preferably 20 mol. % or more, further preferably 25 mol. % or more, and particularly preferably 30 mol. % or more. The upper limit is preferably 65 mol. % or less, more preferably 55 mol. % or less, particularly preferably 50 mol. % or less, and extremely preferably 45 mol. % or less.

Further, it is desired that the degree of saponification of vinyl ester units is preferably 90 mol. % or more, and more preferably 95 mol. % or more. The degree of saponification of ethylene-vinyl alcohol copolymer in the present specification means a rate (mol. %) of the number of moles of vinyl alcohol units to the number of moles of the sum of structural units capable of converted into vinyl alcohol units by saponification (typically, vinyl ester units) and the vinyl alcohol units, contained in the ethylene-vinyl alcohol copolymer. The degree of saponification can be determined based on the description of Japanese Industrial Standards (JIS) K6726-1994.

A rate of the number of moles of the sum of ethylene units, vinyl alcohol units and vinyl ester units to the number of moles of all structural units forming ethylene-vinyl alcohol copolymer is preferably 80 mol. % or more, more preferably 90 mol. % or more, further preferably 95 mol. % or more, and particularly preferably 99 mol. % or more.

Although a melt flow rate of ethylene-vinyl alcohol copolymer (determined by the method described in ASTM D1238 under a condition of a temperature of 190° C. and a load of 2.16 kg) is not particularly restricted, it is preferably 0.1 g/10 min. to 100 g/10 min. A more preferable lower limit is 0.5 g/10 min., and a further preferable lower limit is 1 g/10 min. Further, a more preferable upper limit is 50 g/10 min., and a further preferable upper limit is 20 g/10 min.

The ethylene-vinyl alcohol copolymer microparticles, narrow in particle size distribution, high in sphericity, and excellent in re-dispersibility into an aqueous solvent, are produced by a method wherein, in a system that separates into two phases which include a solution phase containing an ethylene-vinyl alcohol copolymer (A) as the main component and a solution phase containing a polymer (B) different from the ethylene-vinyl alcohol copolymer (A) as the main component when the ethylene-vinyl alcohol copolymer (A), the polymer (B), and an organic solvent (C) having an SP value of 20 $(J/cm^3)^{1/2}$ or more and 30 $(J/cm^3)^{1/2}$ or less are dissolved and mixed together, after an emulsion is formed, the ethylene-vinyl alcohol copolymer (A) is precipitated as microparticles by bringing a poor solvent (D) of the ethylene-vinyl alcohol copolymer (A) into contact with the emulsion.

As concrete examples of the above-described poor solvent (D), water, methanol, ethanol and the like can be exemplified, and these may be used solely, and two or more kinds thereof may be used together. Further, other solvents may be used in a range which does not damage the microparticles.

As the above-described polymer (B), although thermoplastic resins and thermosetting resins can be raised among polymers different from ethylene-vinyl alcohol copolymer, thermoplastic resins are preferred from the viewpoint of being easily dissolved into organic solvent (C).

Concretely, exemplified are polyethylene oxide (hereinafter, also referred to as "PEO" by being abbreviated), polyethylene glycol (hereinafter, also referred to as "PEG" by being abbreviated), polyvinyl alcohol (it may be fully saponified or partially saponified polyvinyl alcohol, hereinafter, also referred to as "PVA" by being abbreviated), hydroxyl alkyl cellulose and the like. From the viewpoint of achieving a narrow particle size distribution, it is preferably polyethylene oxide, polyethylene glycol or polyvinyl alcohol (it may be fully saponified or partially saponified polyvinyl alcohol), and particularly polyethylene oxide or polyethylene glycol is preferred.

As to the molecular weight of polymer (B), the weight average molecular weight is preferably 1,000 or more, and by using such a polymer (B), the phase separation into two phases of a solution phase containing an ethylene-vinyl alcohol copolymer (A) as the main component and a solution phase containing the polymer (B) as the main component is induced, and by forming the emulsion, ethylene-vinyl alcohol copolymer microparticles having a sphericity of 80 or more can be obtained.

Although the molecular weight of polymer (B) is not particularly restricted as long as the phase separation is caused and desirable microparticles can be obtained, it is preferably 1,000 to 10,000,000. From the viewpoint of realizing a viscosity in a vessel that has an industrial practicality, a more preferable upper limit thereof is 1,000,000 or less, further preferably 500,000 or less, and a particularly preferable upper limit is 400,000 or less. Further, from the viewpoint of causing the phase separation more easily, a more preferable lower limit thereof is 10,000 or more, and a further preferable lower limit is 18,000 or more.

The weight average molecular weight indicates a weight average molecular weight determined by gel permeation chromatography (GPC) using water as the solvent and converted in terms of polyethylene glycol.

When it cannot be determined by water, dimethyl formamide is used, and when the determination cannot be performed even by that, tetrahydrofuran is used, and further when the determination cannot be performed even by that, hexafluoroisopropanol is used.

The organic solvent (C) is a solvent dissolving ethylene-vinyl alcohol copolymer (A) and the above-described polymer (B). In particular, because ethylene-vinyl alcohol copolymer microparticles, narrow in particle size distribution and capable of being re-dispersed into a liquid, can be obtained, an organic solvent (C) having an SP value of 20 $(J/cm^3)^{1/2}$ or more and 30 $(J/cm^3)^{1/2}$ or less is used.

Concretely, exemplified are aprotic polar solvents such as N-methyl-2-pyrrolidone, dimethyl sulfoxide, N,N-dimethyl formamide, N,N-dimethyl acetamide, propylene carbonate and acetonitrile; carboxylic acid solvents such as formic acid, acetic acid, propionic acid, butyric acid and lactic acid; or mixtures thereof.

As more preferable examples, exemplified are alcohol solvents, aprotic polar solvents and carboxylic acid solvents which are water-soluble solvents, and further preferably, aprotic polar solvents. Among aprotic polar solvents, because of easy handling, N-methyl-2-pyrrolidone, N,N-dimethyl formamide, N,N-dimethyl acetamide and the like are particularly preferable, dimethyl sulfoxide and N-methyl-2-pyrrolidone are extremely preferable, and dimethyl sulfoxide is most preferable. These solvents may be used together, or may be used solely. When a plurality of solvents are used, the SP value of the mixed solvents is determined by calculation from the SP values and molar fractions of the respective solvents. The SP value referred to here is a value calculated according to Fedor's estimation method based on the coagulation energy density and the molar molecular volume (hereinafter, also referred to as calculation method) ("SP value, base, application and calculation method", Hideki Yamamoto, published by Johokiko Co., Ltd., Mar. 31, 2005). If the calculation cannot be performed by this method, the SP value is calculated from measurements based on whether it is dissolved in a solvent with a known solubility parameter (hereinafter, also referred to as measurement method), and the calculated value is used instead ("Polymer Handbook Fourth Edition", J. Brandrup, published by Wiley, 1998).

The "system that separates into two phases which include a solution phase containing an ethylene-vinyl alcohol copolymer (A) as the main component and a solution phase containing a polymer (B) different from the ethylene-vinyl alcohol copolymer (A) as the main component when the ethylene-vinyl alcohol copolymer (A), the polymer (B), and an organic solvent (C) are dissolved and mixed together" means a system which separates into two phases of a solution phase containing mainly the ethylene-vinyl alcohol copolymer (A) and a solution phase containing mainly the polymer (B) when the ethylene-vinyl alcohol copolymer (A), the polymer (B), and an organic solvent (C) are mixed together.

By using such a system causing the phase separation, it is possible to mix them under a condition causing a phase separation, emulsify the mixture, and form an emulsion.

In the above description, whether the polymers are dissolved or not, is determined depending upon whether dissolved at more than 1 mass % relative to the solvent (C) at a temperature carrying out the method, namely, a temperature when the ethylene-vinyl alcohol copolymer (A) and the polymer (B) are dissolved and mixed together to cause the two phase separation.

In this emulsion, the solution phase of ethylene-vinyl alcohol copolymer (A) becomes a dispersion phase and the solution phase of polymer (B) becomes a continuous phase, and by bringing a poor solvent (D) of the ethylene-vinyl alcohol copolymer (A) into contact with this emulsion, ethylene-vinyl alcohol copolymer microparticles are precipitated from the solution phase of ethylene-vinyl alcohol copolymer (A), thereby obtaining the polymer microparticles formed by the ethylene-vinyl alcohol copolymer (A).

The poor solvent (D) of the ethylene-vinyl alcohol copolymer (A) means a solvent which does not dissolve the ethylene-vinyl alcohol copolymer (A). The "copolymer is not dissolved by the solvent" means that the solubility of the ethylene-vinyl alcohol copolymer (A) to the poor solvent (D) is 1 mass % or less, preferably 0.5 mass % or less, and more preferably 0.1 mass % or less.

In the production method, a poor solvent (D) of the ethylene-vinyl alcohol copolymer (A) is used, and as such a poor solvent (D), a solvent is preferred which is a poor solvent (D) of the ethylene-vinyl alcohol copolymer (A) as well as which is a solvent dissolving the polymer (B). By this, ethylene-vinyl alcohol copolymer microparticles formed by the ethylene-vinyl alcohol copolymer (A) can be efficiently precipitated. Further, it is preferred that the above-described organic solvent (C) and the poor solvent (D) are solvents capable of being mixed uniformly.

As the poor solvent (D), although it varies depending upon the kind of the used ethylene-vinyl alcohol copolymer (A), desirably the kinds of both the used ethylene-vinyl alcohol copolymer (A) and polymer (B), as concrete examples, exemplified is at least one solvent selected from the group consisting of aliphatic hydrocarbon solvents such as pentane, hexane, heptane, octane, nonane, n-decane, n-dodecane, n-tridecane, cyclohexane, and cyclopentane; aromatic hydrocarbon solvents such as benzene, toluene and xylene; alcohol solvents such as methanol, ethanol, 1-propanol and 2-propanol; and water.

From the viewpoint of forming the ethylene-vinyl alcohol copolymer as particles efficiently, it is preferably aliphatic hydrocarbon solvent, alcohol solvent or water, more preferably alcohol solvent or water, and most preferably water.

By adequately selecting and combining the ethylene-vinyl alcohol copolymer (A), the polymer (B), the organic solvent (C) dissolving these, and the poor solvent (D), the ethylene-vinyl alcohol copolymer microparticles can be efficiently precipitated to obtain the polymer microparticles.

It is necessary that the solution, prepared by mixing and dissolving the ethylene-vinyl alcohol copolymer (A), the polymer (B) and the organic solvent (C) dissolving these, is separated into two phases of a solution phase containing the ethylene-vinyl alcohol copolymer (A) as the main component and a solution phase containing the polymer (B) as the main component. In this connection, the organic solvent (C) of the solution phase containing the ethylene-vinyl alcohol copolymer (A) as the main component and the organic solvent (C) of the solution phase containing the polymer (B) as the main component may be same or may be different from each other, but it is preferred that they are substantially same solvents.

The condition to create the state of the two phase separation varies depending upon the kind of the ethylene-vinyl alcohol copolymer (A) or the polymer (B), the molecular weight of the ethylene-vinyl alcohol copolymer (A) or the polymer (B), the kind of the organic solvent (C), the concentration of the ethylene-vinyl alcohol copolymer (A) or the polymer (B), a temperature or a pressure at which the method is to be carried out.

To obtain a condition in that the phase separation state is likely to be created, it is preferred that the SP values of the ethylene-vinyl alcohol copolymer (A) and the polymer (B) are apart from each other, that is, a difference between the SP values is great.

The difference between the SP values is preferably 1 $(J/cm^3)^{1/2}$ or greater, more preferably 2 $(J/cm^3)^{1/2}$ or greater, further preferably 3 $(J/cm^3)^{1/2}$ or greater, particularly preferably 5 $(J/cm^3)^{1/2}$ or greater, and most preferably 8 $(J/cm^3)^{1/2}$ or greater. If the difference between the SP values is within this range, because the phase separation can be easily achieved, ethylene-vinyl alcohol copolymer (A) microparticles having a higher content of the ethylene-vinyl alcohol copolymer component can be obtained.

There are no specific limitations on the upper limit of the difference between the SP values as long as both the ethylene-vinyl alcohol copolymer (A) and the polymer (B) can dissolve in the organic solvent (C), the upper limit of the difference between the SP values is preferably 20 $(J/cm^3)^{1/2}$ or less, more preferably 15 $(J/cm^3)^{1/2}$ or less, and further preferably 10 $(J/cm^3)^{1/2}$ or less. As aforementioned, the SP value referred to here is a value determined by the calculation method based on Fedor's estimation method, or by the measurement method described in "Polymer Handbook Fourth Edition".

Selection of appropriate conditions for phase separation can be determined based on a three-component phase diagram which can be made from a simple preliminary test to observe the states when changing the ratio of the three components of the ethylene-vinyl alcohol copolymer (A), the polymer (B) and the organic solvent (C) dissolving these.

To prepare the phase diagram, the ethylene-vinyl alcohol copolymer (A), the polymer (B) and the organic solvent (C) are mixed and dissolved at an arbitrary ratio, and left at a stationary condition to determine whether an interface is formed. This test is carried out at least at three or more ratios, preferably at five or more ratios, more preferably at 10 or more ratios. By determining the range where two phase separation takes place and the range where only one phase forms, the conditions for desired phase separation can be found.

At that test, to judge whether a phase-separated state can be formed, after the ratio of the ethylene-vinyl alcohol copolymer (A), the polymer (B) and the organic solvent (C) is controlled at an appropriate ratio at the temperature and pressure where the method is to be carried out, the ethylene-vinyl alcohol copolymer (A) and the polymer (B) are dissolved completely, after the dissolution, the solution is stirred sufficiently, left at a stationary condition for three days, and determined by observing whether phase separation occurs macroscopically. However, when a sufficiently stable emulsion is formed, the macroscopic phase separation does not occur even after being left at a stationary condition for three days. In such a case, the occurrence of phase separation is determined based on microscopic phase separation observation carried out by using an optical microscope or phase contrast microscope.

The phase separation takes place as a result of separation between the ethylene-vinyl alcohol copolymer (A) solution phase and the polymer (B) solution phase in the organic solvent (C). The ethylene-vinyl alcohol copolymer (A) solution phase is a phase where mainly the ethylene-vinyl alcohol copolymer (A) is distributed, and the polymer (B) solution phase is a phase where mainly the polymer (B) is distributed. The ethylene-vinyl alcohol copolymer (A) solution phase and the polymer (B) solution phase seem to have a volume ratio that depends on the types and amounts of the ethylene-vinyl alcohol copolymer (A) and the polymer (B).

As the concentrations of the ethylene-vinyl alcohol copolymer (A) and the polymer (B), on the assumption that phase separation can actually take place and that the polymers can actually dissolve in the organic solvent (C) at concentrations in an industrially feasible concentration range, the lower limit of each of the respective concentrations relative to the total mass is preferably 1 mass % or more, more preferably 2 mass % or more, further preferably 3 mass % or more, and still further preferably 5 mass % or more. Further, the upper limit of each of the respective concentrations is preferably 50 mass % or less, more preferably 30 mass % or less, and further preferably 20 mass % or less.

The interfacial tension between the two phases of the ethylene-vinyl alcohol copolymer (A) solution phase and the polymer (B) solution phase is small because both phases are formed of an organic solvent, and this feature allows the resulting emulsion to be maintained stably, which seems to be a major factor causing a narrow particle diameter distribution.

The interfacial tension between the two phases is too small to measure directly with the commonly-used hangingdrop method in which a solution is added to another solution to take measurements. The interfacial tension, however, can be estimated from the surface tension of each phase exposed to air. Thus, assuming $r_1$ and $r_2$ represent the surface tension of each phase exposed to air, the interfacial tension $r_{1/2}$ is estimated as an absolute value of $r_{1/2}=r_1-r_2$.

As a preferable range of this interfacial tension $r_{1/2}$, the upper limit thereof is preferably 10 mN/m, more preferably 5 mN/m, further preferably 3 mN/m, and particularly preferably 2 mN/m. The lower limit thereof is more than 0 mN/m.

The viscosities of the two phases affect the average particle size and the particle size distribution, and the smaller the viscosity ratio between the two phases is, the narrower the particle size distribution tends to become.

As a preferable range of the viscosity ratio between the two phases, the lower limit thereof is preferably 0.1 or more, more preferably 0.2 or more, further preferably 0.3 or more, still more preferably 0.5 or more, and extremely preferably 0.8 or more. Further, the upper limit thereof is preferably 10 or less, more preferably 5 or less, further preferably 3 or less, particularly preferably 1.5 or less, and extremely preferably 1.2 or less. The viscosity ratio between the two phases referred to here is defined as a viscosity of the ethylene-vinyl alcohol copolymer (A) solution phase/a viscosity of the polymer (B) solution phase under a temperature condition at that the method is to be carried out.

Using the system causing phase separation thus prepared, the liquid phases having been separated into the two phases are mixed, and after forming an emulsion, the polymer microparticles are produced.

To produce the microparticles, the step of forming the emulsion and the step of making the microparticles are carried out in a usual reaction vessel. From the viewpoint of industrial realizability, the temperature carrying out the emulsion forming step and the microparticle making step is 0° C. or higher and, although the upper limit of the temperature is not particularly restricted as long as the ethylene-vinyl alcohol copolymer (A) and the polymer (B) can be dissolved, the phase separation can be caused and desired microparticles can be obtained, it is 0° C. to 200° C. from the viewpoint of industrial realizability. The upper limit is preferably 180° C. or lower, more preferably 150° C. or lower, further preferably 120° C. or lower, and particularly preferably 100° C. or lower. Further, the lower limit is preferably 20° C. or higher, and more preferably 30° C. or higher.

The suitable pressure to carry out the method from the viewpoint of industrial realizability is from a normal pressure to 100 atm (10.1 MPa). The upper limit is preferably 50 atm (5.1 MPa) or less, further preferably 30 atm (3.0 MPa) or less, and particularly preferably 20 atm (2.0 MPa) or less. Further, the lower limit is preferably 1 atm (101.3 kPa) or more.

Further, for the reaction vessel, it is preferred to use an inert gas. Concretely, nitrogen, helium, argon and carbon dioxide can be used, and preferably, it is nitrogen or argon.

An emulsion is formed by mixing the system kept in a phase separation state under such a condition. Namely, an emulsion is created by adding a shear force to the phase-separation solution obtained as described above.

The ethylene-vinyl alcohol copolymer microparticles obtained have a narrow particle size distribution, and this is because a very uniform emulsion can be obtained at the stage of emulsion formation. This tendency is remarkable when a single solvent dissolving both the ethylene-vinyl alcohol copolymer (A) and the polymer (B) is used. Therefore, to obtain a sufficient shear force for forming the emulsion, stirring due to a generally known method can serve sufficiently, the mixing can be achieved by a known method such as liquid phase stirring using stirring blades, stirring in a continuous twin mixer, mixing in a homogenizer, ultrasonic irradiation and the like.

In particular, in stirring using stirring blades, although it is depending upon the shape of the stirring blades, the stirring speed is preferably 50 rpm to 1,200 rpm, more preferably 100 rpm to 1,000 rpm, further preferably 200 rpm to 800 rpm, and particularly preferably 300 to 600 rpm.

As the stirring blades, concretely, exemplified are types of propeller, paddle, flat paddle, turbine, double cone, single cone, single ribbon, double ribbon, screw, and helical ribbon, but, the stirring blades are not particularly limited thereto as long as a shear force can be sufficiently applied to the system. Further, to perform efficient stirring, baffle plates or the like may be provided in the vessel.

Further, to create an emulsion, stirrers are not always required, and widely known devices such as emulsifying machine and dispersion machine may be used. As concrete examples, exemplified are batch-type emulsifying machines such as Homogenizer (supplied by IKA Corporation), Polytron (supplied by Kinematica, Inc.), and T. K. Autohomomixer (supplied by Tokushu Kika Kogyo Co., Ltd.), and others such as Ebara Milder (supplied by Ebara Corporation), T. K. Filmics (supplied by Tokushu Kika Kogyo Co., Ltd.), T. K. Pipeline Homomixer (supplied by Tokushu Kika Kogyo Co., Ltd.), Colloid Mill (supplied by Nihon Seiki Kaisha Ltd.), and Slusher, Trigonal Wet Grinder (supplied by Nippon Coke & Engineering Co., Ltd.), as well as ultrasonic homogenizers and static mixers.

The emulsion thus obtained is subsequently subjected to a step to precipitate microparticles.

To obtain microparticles of ethylene-vinyl alcohol copolymer (A), the poor solvent (D) is brought into contact with the emulsion produced by the above-described step to precipitate microparticles having a diameter in correspondence with that of the emulsion.

In particular, the temperature in the reaction vessel at the time of being contacted with the poor solvent (D) is preferably 30° C. or higher, and the method has a remarkable feature in that not by obtaining particles by precipitation due to cooling of a solution but by producing microparticles from the emulsion state obtained from the phase separation system, the ethylene-vinyl alcohol copolymer can be precipitated at a state of true spherical shape and at a state being uniformly dispersed, without forming large aggregates.

The temperature at the time of being contacted with the poor solvent (D) is preferably in a range that the ethylene-vinyl alcohol copolymer microparticles can be obtained at a form of microparticles each having a true spherical shape and a smooth surface, and the contact temperature of the poor solvent (D) is preferably 30° C. or higher, more preferably 50° C. or higher, and most preferably 80° C. or higher because the particle size distribution index of the ethylene-vinyl alcohol copolymer microparticles becomes small. The upper limit thereof is 200° C. or lower at that the ethylene-vinyl alcohol copolymer is not decomposed, more preferably 150° C. or lower, and further preferably 100° C. or lower.

The contact between the poor solvent (D) and the emulsion may be achieved by either pouring the emulsion in the poor solvent, or pouring the poor solvent in the emulsion, but it is preferable to pour the poor solvent in the emulsion.

The method of pouring the poor solvent (D) is not particularly restricted as long as the polymer microparticles to be produced can be obtained, and any of continuous dropping method, split dropping method and batch addition method may be employed. However, continuous dropping method and split dropping method are preferably employed because they can prevent coagulation, fusion or coalescence of the emulsion from being caused when adding the poor solvent, which may lead to a wide particle size distribution or bulky grains larger than 1,000 µm and, to industrially perform it efficiently, the most preferable method is continuous dropping method.

The time to add the poor solvent is preferably within 5 minutes to 50 hours, more preferably within 10 minutes to 10 hours, further preferably within 30 minutes to 5 hours, and particularly preferably within 1 hour to 5 hours.

If it is carried out within a shorter time than these ranges, the emulsion will be likely to undergo coagulation, fusion, or coalescence, which may lead to a wide particle size distribution or bulky grain. Further, the performance of the addition for a longer time than the above-described ranges is not practical in consideration of industrial performance.

Implementation within these time ranges suppresses coagulation among particles when the emulsion is converted to ethylene-vinyl alcohol copolymer microparticles, and to produce ethylene-vinyl alcohol copolymer microparticles with a narrow particle size distribution having a uniform particle diameter.

Although the optimum value of the amount of the poor solvent (D) to be added varies at each time because the state of the emulsion varies depending upon the molecular weight of the polymer (B) and the solubility of the ethylene-vinyl alcohol copolymer (A) into the organic solvent (C), usually it is preferably 0.1 part by mass to 10 parts by mass. The upper limit is more preferably 5 parts by mass or less, further preferably 3 parts by mass or less, particularly preferably 2 parts by mass or less, and most preferably 1 part by mass or less. Further, the lower limit is preferably 0.1 part by mass or more, and further preferably 0.5 part by mass or more.

Although the time of the contact between the poor solvent and the emulsion may be a sufficient time for precipitation of microparticles to cause sufficient precipitation and obtain an efficient productivity, it is preferably 5 minutes to 50 hours, more preferably 5 minutes to 10 hours, further preferably 10 minutes to 5 hours, particularly preferably 20 minutes to 4 hours, most preferably 30 minutes to 3 hours, following the completion of the addition of the poor solvent.

Powder of the microparticles can be collected by subjecting the dispersion liquid of the ethylene-vinyl alcohol copolymer microparticles thus obtained to solid-liquid separation achieved by a generally known method such as filtration, reduced pressure filtration, compression filtration, centrifugal separation, centrifugal filtration, spray drying and the like.

The polymer microparticles obtained from the solid-liquid separation are purified by washing them in a solvent or the like as needed to remove impurities that are carried on the surfaces or contained.

In the method, it is possible to carry out to recycle the organic solvent (C) and the polymer (B) separated in the solid-liquid separation step carried out to produce powder of microparticles for again utilizing them.

The solvent obtained in the solid-liquid separation is a mixture of the polymer (B), the organic solvent (C) and the poor solvent (D). By removing the poor solvent (D) from this mixture, the remaining liquid can be recycled as the solvent to form the emulsion. As the method of removing the poor solvent (D), a generally known method can be employed, and concretely, although simple distillation, reduced pressure distillation, precision distillation, thin film distillation, extraction, membrane separation or the like can be exemplified and, preferably, simple distillation, reduced pressure distillation or precision distillation is employed.

When distillation operation such as simple distillation or reduced pressure distillation is performed, because heat is applied to the system similarly in the production of polymer microparticles and there is a possibility that heat decomposition of the polymer (B) or the organic solvent (C) is promoted, it is preferably performed in an oxygen-free state, more preferably in an inert atmosphere. Concretely, it is carried out preferably under a condition of nitrogen, helium, argon, or carbon dioxide. Further, a phenolic compound may be again added as an antioxidant.

For recycling, it is preferred that the poor solvent (D) is removed as much as possible. Concretely, the amount of the remaining poor solvent (D) is 10 mass % or less, preferably 5 mass % or less, more preferably 3 mass % or less, and particularly preferably 1 mass % or less, relative to the total amount of the organic solvent (C) and the polymer (B) to be recycled. When the remaining amount of the poor solvent (D) is over this range, because the particle size distribution of the microparticles becomes broader, or the particles are coagulated, such a condition is not preferred.

The content of the poor solvent (D) in the solvent mixture used for recycling can be measured by a generally known method such as gas chromatography or the Karl Fischer's method.

In practice, since loss of the organic solvent (C) or the polymer (B) may take place during the operations for removing the poor solvent (D), it is preferred to appropriately adjust the composition ratio to the initial ratio.

With respect to the number average particle diameter in a dry-powder state of the ethylene-vinyl alcohol copolymer microparticles obtained (number-average dry-particle diameter ($Dn_{dry}$)), it is usually 1,000 µm or less for possible production, in a preferable example, 750 µm or less, in a more preferable example, 500 µm or less, in a further preferable example, 250 µm or less, in a particularly preferable example, 150 µm or less, in an extremely preferable example, 100 µm or less, and in a most preferable example, 75 µm or less. The lower limit thereof for possible production is usually 0.1 µm or more, in a preferable example, 0.5 µm or more, in a more preferable example, 1 µm or more, in a further preferable example, 3 µm or more, in a particularly preferable example, 5 µm or more, and in an extremely preferable example, 10 µm or more.

The ethylene-vinyl alcohol copolymer microparticles have features that the particle size distribution is narrow and the particle size distribution index is 2 or less.

Since the flowability of the microparticles is improved and the workability when the obtained microparticles are used as a dispersion liquid or a resin composition is improved, the particle size distribution index is preferably 1.8 or less, more preferably 1.5 or less, further preferably 1.3 or less, and most preferably 1.2 or less. Further, its lower limit is 1 theoretically.

The number average particle diameter in a dry-powder state of the ethylene-vinyl alcohol copolymer microparticles ($Dn_{dry}$) can be determined by measuring diameters of 100 particles randomly selected from an image of a scanning electron microscope and calculating the arithmetic average. At that time, to determine a precise number average particle diameter reflected with dispersion in particle diameter, the measurement is performed at a magnification of 50 times to 5,000 times, and particles of 2 or more and less than 100 are to be taken in a single image. Although it depends upon the particle diameters of the particles to be measured, the lower limit of the magnification is preferably 50 times or more, and more preferably 500 times or more. Further, the upper limit of the magnification is preferably 5,000 times or less, and more preferably 1,000 times or less. When the particles in the image are not truly circular (for example, oval shapes and the like), or when aggregates collected with particles irregularly are formed, the major axis thereof is defined as the particle diameter.

Further, the volume average particle diameter of dry powder ($Dv_{dry}$) and the particle size distribution index are determined based on the following numerical conversion equation (Equation 1) using the value of the number average particle diameter ($Dn_{dry}$) obtained as described above.

$$D_{ndry} = \left(\sum_{i=1}^{n} R_i\right) / n \quad (1)$$

$$D_{vdry} = \sum_{i=1}^{n} R_i^4 / \sum_{i=1}^{n} R_i^3$$

$$PDI = D_{vdry} / D_{ndry}$$

In Equation 1, $R_i$ represents the diameter of each particle, n represents the number of measurements (100), $Dn_{dry}$ represents the number-average dry-particle diameter, $Dv_{dry}$ represents the volume-average dry-particle diameter, and PDI represents the particle size distribution index.

Further, the volume-average wet-particle diameter in a dispersion containing the ethylene-vinyl alcohol copolymer microparticles ($Dv_{wet}$) is determined by preparing water as the dispersion solvent, after mixing the particles into the dispersion solvent at a concentration of 0.1 mass %, applying a ultrasonic treatment at 25 kHz for one minute to prepare a dispersion for measurement, and with the dispersion, determining the volume-average wet-particle diameter as an average value of the cumulative distribution at a volume standard thereof using a laser diffraction particle size distribution analyzer.

The ethylene-vinyl alcohol copolymer microparticles have a feature in that the microparticles are good in re-dispersibility, the volume average particle diameters in a dry-powder state and in an aqueous-dispersion state are high in repeatability, and a re-dispersibility index of the microparticles represented as a ratio ($Dv_{wet}/Dv_{dry}$) of a volume average particle diameter in a dry-powder state ($Dv_{dry}$) to a volume average particle diameter in an aqueous-dispersion state ($Dv_{wet}$) is 1/9 or more and 9 or less.

When the dispersion re-dispersed with the ethylene-vinyl alcohol copolymer microparticles is formed as a coating layer for barrier coating, in particular, when the dispersion is applied to a surface having a complicated fine structure, it is preferred that the particles are dispersed uniformly in a liquid without being coagulated because the application performance is improved and uniform coating becomes possible up to the fine portions. The re-dispersibility index of the microparticles represented as the ratio ($Dv_{wet}/Dv_{dry}$) is preferably 1/5 or more and 5 or less, more preferably 1/2 or more and 2 or less, further preferably 2/3 or more and 1.5 or less, and most preferably 0.9 or more and 1.1 or less. Further, the extremal value thereof is 1.

The re-dispersibility index of the ethylene-vinyl alcohol copolymer microparticles in a dry-powder state and in an aqueous-dispersion state is calculated according to the following equation (Equation 2), using the volume-average dry-particle diameter $Dv_{dry}$ in a dry state determined using a scanning electron microscope and the volume-average wet-particle diameter $Dv_{wet}$ in a dispersion state determined using a laser diffraction particle size distribution analyzer as described above.

$$\text{Re-dispersibility index} = D_{vwet}/D_{vdry} \quad (2)$$

In Equation 2, $Dv_{dry}$ represents the volume-average dry-particle diameter, and $Dv_{wet}$ represents the volume-average wet-particle diameter.

Since the ethylene-vinyl alcohol copolymer microparticles are excellent in re-dispersibility index as described above, a dispersion dispersed with the microparticles in a dry-powder state into a desired dispersion medium can be prepared. Then, when the microparticles are thus made into a dispersion, the microparticles are not coagulated, and a stable dispersion can be obtained.

The dispersion medium to disperse the ethylene-vinyl alcohol copolymer microparticles is not particularly limited as long as it is a medium which does not cause coagulation of the particles. In consideration of the particle dispersion being formed into a coating layer for barrier coating, water is preferred as the dispersion medium from the viewpoints that in that process an organic solvent is volatilized and it causes deterioration of working environment and that there is an economic problem that an apparatus for recycling the organic solvent is required. Although a ratio of the dispersion medium and the microparticles in the dispersion also is not particularly limited, it is preferred to employ a ratio of the microparticles to the dispersion of 0.1 to 75 mass %.

Further, because the ethylene-vinyl alcohol copolymer microparticles are excellent in re-dispersibility index as described above, even when being made into a resin composition, the microparticles are not coagulated in the resin and, therefore, a resin composition uniformly dispersed with the microparticles can be obtained. As the resin to make a resin composition, known thermoplastic resins, thermosetting resins or the like can be used, and a resin composition having a composition of the microparticles of 0.1 to 75 mass % can be obtained. As the method of producing the resin composition, exemplified are a method of mixing microparticles in a dry state into a resin, a method of mixing microparticles in a dry state and resin raw material powder and, thereafter, melting the resin raw material powder, a method of mixing a dispersion of microparticles with a resin and, thereafter, removing a dispersion medium or the like.

Further, the ethylene-vinyl alcohol copolymer microparticles obtained have a feature that the surfaces thereof are smooth and the average sphericity thereof is 80 or more.

Since flowability of the microparticles is improved and workability when the obtained microparticles are used as a dispersion liquid or a resin composition is improved, the average sphericity is preferably 85 or more, more preferably 90 or more, further preferably 95 or more, and most preferably 98 or more. Further, the upper limit thereof is 100.

The average sphericity of the ethylene-vinyl alcohol copolymer microparticles means an average of the sphericities of 30 particles randomly selected from an image of a scanning electron microscope similarly to the measurement of the particle diameter, and is calculated based on the following equation (Equation 3). The sphericity means a ratio of a minor axis to a major axis of each particle, and is calculated based on Equation 3.

$$\text{Average sphericity} = \left(\sum_{i=1}^{n} \text{sphericity}\right) / n \quad (3)$$

$$\text{Sphericity} = (\text{minor axis}/\text{major axis}) * 100$$

In Equation 3, n represents measurement times of 30.

The ethylene-vinyl alcohol copolymer microparticles obtained are narrow in particle size distribution, high in sphericity, and high in repeatability of average particle diameters in a dry-powder state and in an aqueous dispersion state. Therefore, we can transport and preserve for a long term the ethylene-vinyl alcohol copolymer microparticles as dry powder. Further, since the ethylene-vinyl alcohol copolymer microparticles exhibit a good re-dispersibility into a liquid and exhibit a narrow particle size distribution even in the liquid when a coating is performed using the microparticles, a high workability can be realized at the time of forming a coating layer, and because a uniform thin layer can be coated, a gas barrier coating exhibiting a uniform and high smoothness can be performed even after drying the coated layer.

EXAMPLES

Hereinafter, our microparticles, dispersion liquids, compositions and methods will be explained based on examples, but this disclosure is not limited thereto.

(1) Method of Determining Average Particle Diameter and Particle Size Distribution of Dry Powder:

The particle diameter of each microparticle was measured by observing the microparticle by a scanning electron microscope (JSM-6301NF, supplied by JEOL Ltd.) at a magnification of 100 times. When a particle did not have a true circle shape, the major axis thereof was measured as its particle diameter. The average particle diameter was determined by measuring diameters of 100 particles randomly selected from an image of the scanning electron microscope and calculating the arithmetic average thereof, and the obtained value was defined as a number-average dry-particle diameter ($Dn_{dry}$). A particle size distribution index PDI indicating a particle size distribution was calculated by the following numerical conversion equation (Equation 4) using the value of ($Dn_{dry}$) obtained as described above.

$$D_{ndry} = \left(\sum_{i=1}^{n} R_i\right)/n \qquad (4)$$

$$D_{vdry} = \sum_{i=1}^{n} R_i^4 / \sum_{i=1}^{n} R_i^3$$

$$PDI = D_{vdry}/D_{ndry}$$

In Equation 4, $R_i$ represents the diameter of each particle, n represents the number of measurements (100), $Dn_{dry}$ represents the number-average dry-particle diameter, $Dv_{dry}$ represents the volume-average dry-particle diameter, and PDI represents the particle size distribution index.

(2) Method of Determining Average Particle Diameter in a Liquid:

The particle size distribution of microparticles in a liquid was determined by preparing water as the dispersion solvent, after mixing the particles into the dispersion solvent at a concentration of 0.1 mass %, applying a ultrasonic treatment at 25 kHz for one minute, and determining it using a laser diffraction particle size distribution analyzer (SALD-2100, supplied by Shimadzu Corporation). With respect to the obtained cumulative distribution at a volume standard, the average value thereof was defined as a volume-average wet-particle diameter ($Dv_{wet}$).

(3) Method of Calculating Re-Dispersibility Index of Particles:

The re-dispersibility index was calculated according to the following equation (Equation 5), using the volume-average dry-particle diameter $Dv_{dry}$ determined using a scanning electron microscope and the volume-average wet-particle diameter $Dv_{wet}$ in water determined using a laser diffraction particle size distribution analyzer as described above.

$$\text{Re-dispersibility index} = D_{vwet}/D_{vdry} \qquad (5)$$

In Equation 5, $Dv_{dry}$ represents the volume-average dry-particle diameter, and $Dv_{wet}$ represents the volume-average wet-particle diameter.

(4) Method of Determining Average Sphericity of Dry Powder:

The average sphericity means an average of the sphericities of 30 particles randomly selected from an image of a scanning electron microscope, and is calculated based on the following equation (Equation 6). The sphericity means a ratio of a minor axis to a major axis of each particle, and is calculated based on the following equation (Equation 6).

$$\text{Average sphericity} = \left(\sum_{i=1}^{n} \text{sphericity}\right)/n \qquad (6)$$

$$\text{Sphericity} = (\text{minor axis}/\text{major axis}) * 100$$

In Equation 6, n represents measurement times of 30.

Example 1

5 parts by weight of ethylene-vinyl alcohol copolymer ("EVAL" (registered trade mark) F101A supplied by Kuraray Co., Ltd., content of ethylene: 32 mol %, degree of saponification: 98% or more, melt flow rate (determined by the method described in ASTM D1238 under conditions of a temperature of 190° C. and a load of 2.16 kg): 1.6 g/10 min.), 10 parts by weight of polyethylene glycol (PEG, weight average molecular weight: 18,000) as the polymer (B), and 85 parts by weight of N-methyl-2-pyrrolidone (NMP) as the organic solvent (C) were put into a 200 mL separable flask, heated at 80° C. and stirred for 2 hours. The temperature of the system was changed to 30° C. and while stirred at 450 rpm, 100 parts by weight of ion-exchanged water as the poor solvent (D) was dropped at a speed of 0.42 g/min. through a feed pump. The obtained suspension was filtered and washed by 100 parts by weight of ion-exchanged water, and the substances separated by the filtration were vacuum dried at 80° C. to prepare white powder of ethylene-vinyl alcohol copolymer microparticles. From the image of a scanning electron microscope of the obtained dry powder, the number-average dry-particle diameter $Dn_{dry}$, the volume-average dry-particle diameter $Dv_{dry}$, the particle size distribution index PDI, and the sphericity were calculated by the equations. Then, after the obtained dry powder was mixed into water at a concentration of 0.1 mass %, a ultrasonic treatment at 25 kHz was applied, and the volume-average wet-particle diameter $Dv_{wet}$ was determined using a laser diffraction particle size distribution analyzer. From the obtained values, the re-dispersibility index $Dv_{wet}/Dv_{dry}$ of the particles was calculated. The results thereof are shown in Table 1. The particle size distribution of the particles at a dry-powder state was narrow, a high sphericity was exhibited and, further, a high re-dispersibility into water was exhibited.

Example 2

5 parts by weight of ethylene-vinyl alcohol copolymer ("EVAL" (registered trade mark) F101A supplied by Kuraray Co., Ltd., content of ethylene: 32 mol %, degree of saponification: 98% or more, melt flow rate (determined by the method described in ASTM D1238 under conditions of a temperature of 190° C. and a load of 2.16 kg): 1.6 g/10 min.), 10 parts by weight of polyethylene glycol (PEG, weight average molecular weight: 18,000) as the polymer (B), and 85 parts by weight of N-methyl-2-pyrrolidone (NMP) as the organic solvent (C) were put into a 200 mL separable flask, heated at 80° C. and stirred for 2 hours. While the temperature of the system was kept at 80° C., and while stirred at 450 rpm, 100 parts by weight of ion-exchanged water as the poor solvent (D) was dropped at a speed of 0.42 g/min. through a feed pump. The obtained suspension was filtered and washed by 100 parts by weight of ion-exchanged water, and the substances separated by the filtration were vacuum dried at 80° C. to prepare white powder of ethylene-vinyl alcohol copolymer microparticles. From the image of a scanning electron microscope of the obtained dry powder, the number-average dry-particle diameter $Dn_{dry}$, the volume-average dry-particle diameter $Dv_{dry}$, the particle size distribution index PDI, and the sphericity were calculated by the equations. Then, after the obtained dry powder was mixed into water at a concentration of 0.1 mass %, a ultrasonic treatment at 25 kHz was applied, and the volume-average wet-particle diameter $Dv_{wet}$ was determined using a laser diffraction particle size distribution analyzer. From the obtained values, the re-dispersibility index $Dv_{wet}/Dv_{dry}$ of the particles was calculated. The results thereof are shown in Table 1. The particle size distribution of the particles at a dry-powder state was narrow, a high sphericity was exhibited and, further, a high re-dispersibility into water was exhibited.

Example 3

5 parts by weight of ethylene-vinyl alcohol copolymer ("EVAL" (registered trade mark) F101A supplied by Kuraray Co., Ltd., content of ethylene: 32 mol %, degree of saponification: 98% or more, melt flow rate (determined by the method described in ASTM D1238 under conditions of a temperature of 190° C. and a load of 2.16 kg): 1.6 g/10 min.), 5 parts by weight of polyethylene oxide (PEO, "Alkox" (registered trade mark) E-30 supplied by Meisei Chemical Works, Ltd., weight average molecular weight: 400,000) as the polymer (B), and 90 parts by weight of N-methyl-2-pyrrolidone (NMP) as the organic solvent (C) were put into a 200 mL separable flask, heated at 80° C. and stirred for 2 hours. While the temperature of the system was kept at 80° C., and while stirred at 450 rpm, 100 parts by weight of ion-exchanged water as the poor solvent (D) was dropped at a speed of 0.42 g/min. through a feed pump. The obtained suspension was filtered and washed by 100 parts by weight of ion-exchanged water, and the substances separated by the filtration were vacuum dried at 80° C. to prepare white powder of ethylene-vinyl alcohol copolymer microparticles. From the image of a scanning electron microscope of the obtained dry powder, the number-average dry-particle diameter $Dn_{dry}$, the volume-average dry-particle diameter $Dv_{dry}$, the particle size distribution index PDI, and the sphericity were calculated by the equations. Then, after the obtained dry powder was mixed into water at a concentration of 0.1 mass %, a ultrasonic treatment at 25 kHz was applied, and the volume-average wet-particle diameter $Dv_{wet}$ was determined using a laser diffraction particle size distribution analyzer. From the obtained values, the re-dispersibility index $Dv_{wet}/Dv_{dry}$ of the particles was calculated. The results thereof are shown in Table 1. Further, the image of a scanning electron microscope of the obtained particles is shown in FIG. 1. The particle size distribution of the particles at a dry-powder state was narrow, a high sphericity was exhibited and, further, a high re-dispersibility into water was exhibited.

Example 4

5 parts by weight of ethylene-vinyl alcohol copolymer ("EVAL" (registered trade mark) F101A supplied by Kuraray Co., Ltd., content of ethylene: 32 mol %, degree of saponification: 98% or more, melt flow rate (determined by the method described in ASTM D1238 under conditions of a temperature of 190° C. and a load of 2.16 kg): 1.6 g/10 min.), 5 parts by weight of polyethylene oxide (PEO, "Alkox" (registered trade mark) L-8 supplied by Meisei Chemical Works, Ltd., weight average molecular weight: 90,000) as the polymer (B), and 90 parts by weight of dimethylsulfoxide (DMSO) as the organic solvent (C) were put into a 200 mL separable flask, heated at 90° C. and stirred for 2 hours. While the temperature of the system was kept at 90° C., and while stirred at 450 rpm, 100 parts by weight of ion-exchanged water as the poor solvent (D) was dropped at a speed of 0.42 g/min. through a feed pump. The obtained suspension was filtered and washed by 100 parts by weight of ion-exchanged water, and the substances separated by the filtration were vacuum dried at 80° C. to prepare white powder of ethylene-vinyl alcohol copolymer microparticles. From the image of a scanning electron microscope of the obtained dry powder, the number-average dry-particle diameter $Dn_{dry}$, the volume-average dry-particle diameter $Dv_{dry}$, the particle size distribution index PDI, and the sphericity were calculated by the equations. Then, after the obtained dry powder was mixed into water at a concentration of 0.1 mass %, a ultrasonic treatment at 25 kHz was applied, and the volume-average wet-particle diameter $Dv_{wet}$ was determined using a laser diffraction particle size distribution analyzer. From the obtained values, the re-dispersibility index $Dv_{wet}/Dv_{dry}$ of the particles was calculated. The results thereof are shown in Table 1. The particle size distribution of the particles at a dry-powder state was narrow, a high sphericity was exhibited and, further, a high re-dispersibility into water was exhibited.

Example 5

5 parts by weight of ethylene-vinyl alcohol copolymer ("EVAL" (registered trade mark) F101A supplied by Kuraray Co., Ltd., content of ethylene: 32 mol %, degree of saponification: 98% or more, melt flow rate (determined by the method described in ASTM D1238 under conditions of a temperature of 190° C. and a load of 2.16 kg): 1.6 g/10 min.), 10 parts by weight of polyethylene oxide (PEO, "Alkox" (registered trade mark) L-11 supplied by Meisei Chemical Works, Ltd., weight average molecular weight: 130,000) as the polymer (B), and 85 parts by weight of dimethylsulfoxide (DMSO) as the organic solvent (C) were put into a 200 mL separable flask, heated at 80° C. and stirred for 2 hours. While the temperature of the system was kept at 80° C., and while stirred at 450 rpm, 100 parts by weight of ion-exchanged water as the poor solvent (D) was dropped at a speed of 0.42 g/min. through a feed pump. The obtained suspension was filtered and washed by 100 parts by weight of ion-exchanged water, and the substances separated by the filtration were vacuum dried at 80° C. to prepare white powder of ethylene-vinyl alcohol copolymer microparticles. From the image of a scanning electron microscope of the obtained dry powder, the number-average dry-particle diameter $Dn_{dry}$, the volume-average dry-particle diameter $Dv_{dry}$, the particle size distribution index PDI, and the sphericity were calculated by the equations. Then, after the obtained dry powder was mixed into water at a concentration of 0.1 mass %, a ultrasonic treatment at 25 kHz was applied, and the volume-average wet-particle diameter $Dv_{wet}$ was determined using a laser diffraction particle size distribution analyzer. From the obtained values, the re-dispersibility index $Dv_{wet}/Dv_{dry}$ of the particles was calculated. The results thereof are shown in Table 1. The particle size distribution of the particles at a dry-powder state was narrow, a high sphericity was exhibited and, further, a high re-dispersibility into water was exhibited.

Example 6

Figure 2:
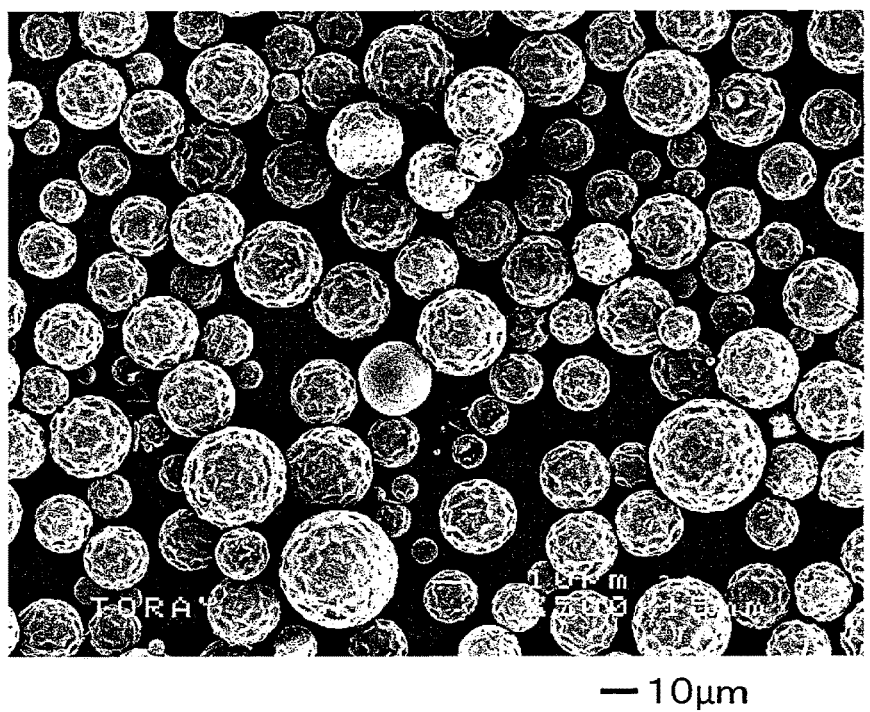
FIG. 2 is an image of scanning electron microscope (magnification: 500 times) of ethylene-vinyl alcohol copolymer microparticles prepared in Example 6.

3 parts by weight of ethylene-vinyl alcohol copolymer ("EVAL" (registered trade mark) F101A supplied by Kuraray Co., Ltd., content of ethylene: 32 mol %, degree of saponification: 98% or more, melt flow rate (determined by the method described in ASTM D1238 under conditions of a temperature of 190° C. and a load of 2.16 kg): 1.6 g/10 min.), 3 parts by weight of polyethylene oxide (PEO, "Alkox" (registered trade mark) E-30 supplied by Meisei Chemical Works, Ltd., weight average molecular weight: 400,000) as the polymer (B), and 94 parts by weight of dimethylsulfoxide (DMSO) as the organic solvent (C) were put into a 200 mL separable flask, heated at 80° C. and stirred for 2 hours. While the temperature of the system was kept at 80° C., and while stirred at 450 rpm, 100 parts by weight of ion-exchanged water as the poor solvent (D) was dropped at a speed of 0.42 g/min. through a feed pump. The obtained suspension was filtered and washed by 100 parts by weight of ion-exchanged water, and the substances separated by the filtration were vacuum dried at 80° C. to prepare white powder of ethylene-vinyl alcohol copolymer microparticles. From the image of a scanning electron microscope of the obtained dry powder, the number-average dry-particle diameter $Dn_{dry}$, the volume-average dry-particle diameter $Dv_{dry}$, the particle size distribution index PDI, and the sphericity were calculated by the equations. Then, after the obtained dry powder was mixed into water at a concentration of 0.1 mass %, a ultrasonic treatment at 25 kHz was applied, and the volume-average wet-particle diameter $Dv_{wet}$ was determined using a laser diffraction particle size distribution analyzer. From the obtained values, the re-dispersibility index $Dv_{wet}/Dv_{dry}$ of the particles was calculated. The results thereof are shown in Table 1. Further, the image of a scanning electron microscope of the obtained particles is shown in FIG. 2. The particle size distribution of the particles at a dry-powder state was narrow, a high sphericity was exhibited and, further, a high re-dispersibility into water was exhibited.

Example 7

5 parts by weight of ethylene-vinyl alcohol copolymer ("EVAL" (registered trade mark) F101A supplied by Kuraray Co., Ltd., content of ethylene: 32 mol %, degree of saponification: 98% or more, melt flow rate (determined by the method described in ASTM D1238 under conditions of a temperature of 190° C. and a load of 2.16 kg): 1.6 g/10 min.), 5 parts by weight of polyvinyl alcohol (PVA, "Gohsenol" (registered trade mark) G-type GL-05 supplied by Nippon Synthetic Chemical Industry Co., Ltd., weight average molecular weight: 12,000) as the polymer (B), and 90 parts by weight of N-methyl-2-pyrrolidone (NMP) as the organic solvent (C) were put into a 200 mL separable flask, heated at 80° C. and stirred for 2 hours. The temperature of the system was changed to 30° C. and while stirred at 450 rpm, 100 parts by weight of ion-exchanged water as the poor solvent (D) was dropped at a speed of 0.42 g/min. through a feed pump. The obtained suspension was filtered and washed by 100 parts by weight of ion-exchanged water, and the substances separated by the filtration were vacuum dried at 80° C. to prepare white powder of ethylene-vinyl alcohol copolymer microparticles. From the image of a scanning electron microscope of the obtained dry powder, the number-average dry-particle diameter $Dn_{dry}$, the volume-average dry-particle diameter $Dv_{dry}$, the particle size distribution index PDI, and the sphericity were calculated by the equations. Then, after the obtained dry powder was mixed into water at a concentration of 0.1 mass %, a ultrasonic treatment at 25 kHz was applied, and the volume-average wet-particle diameter $Dv_{wet}$ was determined using a laser diffraction particle size distribution analyzer. From the obtained values, the re-dispersibility index $Dv_{wet}/Dv_{dry}$ of the particles was calculated. The results thereof are shown in Table 1. The particle size distribution of the particles at a dry-powder state was narrow, a high sphericity was exhibited and, further, a high re-dispersibility into water was exhibited.

Comparative Example 1

5 parts by weight of ethylene-vinyl alcohol copolymer ("EVAL" (registered trade mark) F101A supplied by Kuraray Co., Ltd., content of ethylene: 32 mol %, degree of saponification: 98% or more, melt flow rate (determined by the method described in ASTM D1238 under conditions of a temperature of 190° C. and a load of 2.16 kg): 1.6 g/10 min.), 10 parts by weight of polyethylene glycol (PEG, weight average molecular weight: 18,000) as the polymer (B), and 85 parts by weight of tetrahydrofuran (THF) as the organic solvent (C) were put into a 200 mL separable flask, heated at 80° C. and stirred for 2 hours. However, because the ethylene-vinyl alcohol copolymer was not dissolved into the solvent and a phase-separation system could not be obtained, particles could not be made.

Comparative Example 2

5 parts by weight of ethylene-vinyl alcohol copolymer ("EVAL" (registered trade mark) F101A supplied by Kuraray Co., Ltd., content of ethylene: 32 mol %, degree of saponification: 98% or more, melt flow rate (determined by the method described in ASTM D1238 under conditions of a temperature of 190° C. and a load of 2.16 kg): 1.6 g/10 min.), 10 parts by weight of polyethylene glycol (PEG, weight average molecular weight: 18,000) as the polymer (B), and 85 parts by weight of diethylene glycol dimethyl ether (MDM) as the organic solvent (C) were put into a 200 mL separable flask, heated at 140° C. and stirred for 2 hours. However, because the ethylene-vinyl alcohol copolymer was not dissolved into the solvent and a phase-separation system could not be obtained, particles could not be made.

Comparative Example 3

5 parts by weight of ethylene-vinyl alcohol copolymer ("EVAL" (registered trade mark) F101A supplied by Kuraray Co., Ltd., content of ethylene: 32 mol %, degree of saponification: 98% or more, melt flow rate (determined by the method described in ASTM D1238 under conditions of a temperature of 190° C. and a load of 2.16 kg): 1.6 g/10 min.), 10 parts by weight of polyethylene oxide (PEO, "Alkox" (registered trade mark) L-8 supplied by Meisei Chemical Works, Ltd., weight average molecular weight: 90,000) as the polymer (B), and 85 parts by weight of N-methyl-2-pyrrolidone (NMP) as the organic solvent (C) were put into a 200 mL separable flask, heated at 80° C. and stirred for 2 hours. The temperature of the system was changed to 5° C., and while stirred at 450 rpm, 100 parts by weight of ion-exchanged water as the poor solvent (D) was dropped at a speed of 0.42 g/min. through a feed pump. The obtained suspension was filtered and washed by 100 parts by weight of ion-exchanged water, and the substances separated by the filtration were vacuum dried at 80° C. to prepare dry material of ethylene-vinyl alcohol copolymer microparticles. However, the obtained dry material formed strong bulky grains and it was impossible to observe and determine the particle diameters by a scanning electron microscope. Even though the bulky grains were introduced into water, they were precipitated and not re-dispersed.

Comparative Example 4

Figure 3:
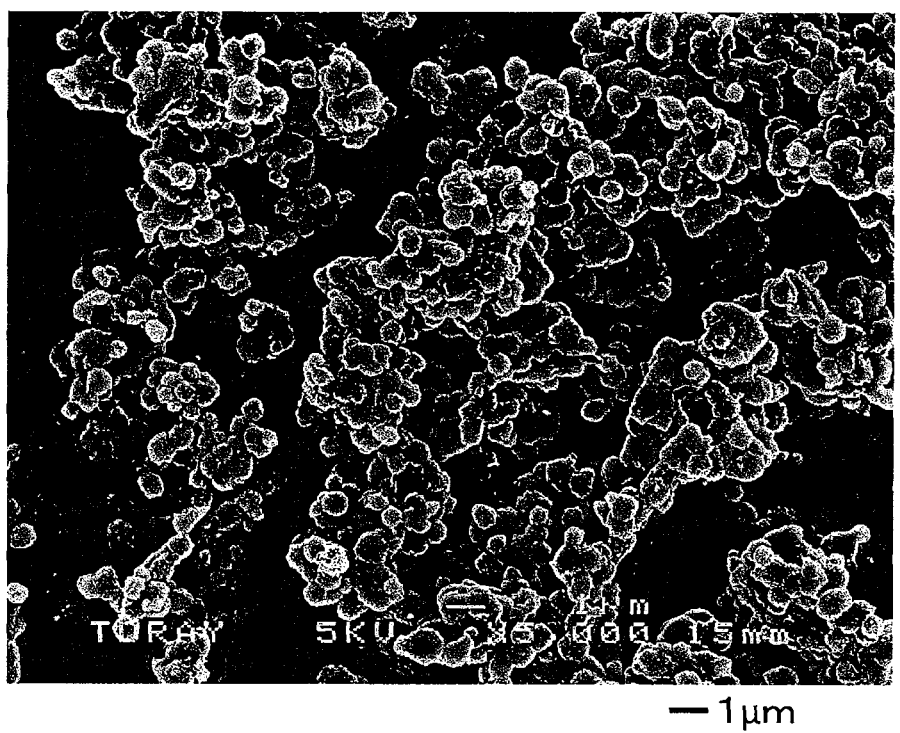
FIG. 3 is an image of scanning electron microscope (magnification: 5,000 times) of ethylene-vinyl alcohol copolymer microparticles prepared in Comparative Example 4.

With respect to the aqueous dispersion of ethylene-vinyl alcohol copolymer obtained by the method described in Example 1 of JP 2001-234019 A, after ethylene-vinyl alcohol copolymer microparticles were separated by filtration, they were washed by ion-exchanged water, and they were vacuum dried at 80° C. to obtain dry material of ethylene-vinyl alcohol copolymer microparticles. The obtained dry material formed strong bulky grains and it was impossible to observe and determine the particle diameters by a scanning electron microscope. When a part of the bulky grains were taken out by crushing and they were observed by a scanning electron microscope, they exhibited the form shown in FIG. 3, the particles adhered to each other and formed aggregates. Furthermore, even though the bulky grains were introduced into water, they were precipitated, and not re-dispersed.

TABLE 1

| | Organic solvent (C) | | Polymer (B) | | Temperature at the time of poor solvent (D) contact (° C.) | Dry powder | | | | Dispersion $Dv_{wet}$ (μm) | Re-dispersibility index $Dv_{wet}/Dv_{dry}$ (—) |
|---|---|---|---|---|---|---|---|---|---|---|---|
| | Kind of solvent | SP value $(J/cm^3)^{1/2}$ | Kind of polymer | Mw | | $Dn_{dry}$ (μm) | $Dv_{dry}$ (μm) | index PDI (—) | Sphericity (%) | | |
| Example 1 | NMP | 23.1 | PEG | 18,000 | 30 | 35.54 | 40.68 | 1.145 | 89.1 | 79.29 | 1.95 |
| Example 2 | NMP | 23.1 | PEG | 18,000 | 80 | 120.1 | 154.6 | 1.287 | 90.6 | 139.8 | 0.90 |
| Example 3 | NMP | 23.1 | PEO | 400,000 | 80 | 60.27 | 66.64 | 1.106 | 97.8 | 79.17 | 1.19 |
| Example 4 | DMSO | 29.7 | PEO | 90,000 | 90 | 41.71 | 62.86 | 1.507 | 83.5 | 68.31 | 1.09 |
| Example 5 | DMSO | 29.7 | PEO | 130,000 | 80 | 12.51 | 24.87 | 1.988 | 95.5 | 23.90 | 0.96 |
| Example 6 | DMSO | 29.7 | PEO | 400,000 | 80 | 20.58 | 22.31 | 1.084 | 98.0 | 25.59 | 1.15 |
| Example 7 | NMP | 23.1 | PVA | 12,000 | 30 | 86.6 | 137.0 | 1.582 | 77.0 | 407.3 | 2.97 |
| Comparative example 1 | THF | 18.6 | PEG | 18,000 | 80 | EVOH was not dissolved, it is impossible to make particles. | | | | | |
| Comparative example 2 | MDM | 17.4 | PEG | 18,000 | 140 | EVOH was not dissolved, it is impossible to make particles. | | | | | |
| Comparative example 3 | NMP | 23.1 | PEO | 90,000 | 5 | Bulky grains formed (measurement impossible) | | | | Precipitation | — |
| Comparative example 4 | IPA sol. | — | PEG | 18,000 | — | Bulky grains formed (measurement impossible) | | | | Precipitation | — |

INDUSTRIAL APPLICABILITY

Our ethylene-vinyl alcohol copolymer microparticles are excellent in gas barrier property, oil resistance, organic solvent resistance, aroma retaining property, weatherability, transparency and the like and in particular, are suitable for use in coating layers required with various barrier properties.

The invention claimed is:
1. Ethylene-vinyl alcohol copolymer microparticles having a particle size distribution index in a dry-powder state of 2 or less, wherein a number average particle diameter in a dry-powder state ($Dn_{dry}$) of said microparticles is 0.1 to 750 μm, and a re-dispersibility index of said microparticles represented as a ratio of a volume average particle diameter in a dry-powder state ($Dv_{dry}$) to a volume average particle diameter in an aqueous-dispersion state ($Dv_{wet}$) is 1/9 or more and 9 or less.

2. The ethylene-vinyl alcohol copolymer microparticles according to claim 1, wherein sphericity of said microparticles in a dry-powder state is 80 or more.

3. A dispersion liquid containing the ethylene-vinyl alcohol copolymer microparticles according to claim 1.

4. A resin composition containing the ethylene-vinyl alcohol copolymer microparticles according to claim 1.

* * * * *